(12) United States Patent
Chang et al.

(10) Patent No.: US 10,826,101 B2
(45) Date of Patent: *Nov. 3, 2020

(54) FLOW BATTERY APPARATUS WITH SHUNTED CURRENT REPRESSED AND METHOD THEREOF

(71) Applicant: Institute of Nuclear Energy Research, Atomic Energy Council, Executive Yuan, R.O.C., Taoyuan (TW)

(72) Inventors: Hwei-Liang Chang, Taoyuan (TW); Ning-Yih Hsu, Taoyuan (TW); Yao-Sheng Hsu, Taipei (TW); Zone-Sure Chang, Taipei (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 40 days.

This patent is subject to a terminal disclaimer.

(21) Appl. No.: 16/251,895

(22) Filed: Jan. 18, 2019

(65) Prior Publication Data

US 2019/0173117 A1 Jun. 6, 2019

Related U.S. Application Data

(63) Continuation of application No. 15/203,415, filed on Jul. 11, 2016, now Pat. No. 10,211,476.

(30) Foreign Application Priority Data

Aug. 14, 2015 (TW) .............................. 104126636 A

(51) Int. Cl.
*H01M 8/18* (2006.01)
*H01M 8/04276* (2016.01)
(Continued)

(52) U.S. Cl.
CPC ....... *H01M 8/188* (2013.01); *H01M 8/04186* (2013.01); *H01M 8/04276* (2013.01);
(Continued)

(58) Field of Classification Search
CPC ......... H01M 8/04186; H01M 8/04276; H01M 8/188; H01M 8/20; H01M 8/2459; H01M 8/2483; Y02E 60/528
See application file for complete search history.

(56) References Cited

U.S. PATENT DOCUMENTS

2012/0202127 A1* 8/2012 Friesen ................. H01M 12/08
429/406

\* cited by examiner

*Primary Examiner* — Victoria H Lynch
(74) *Attorney, Agent, or Firm* — Jackson IPG PLLC; Demian K. Jackson

(57) ABSTRACT

A flow battery apparatus is provided with shunted currents repressed. The apparatus has a positive electrode device, a negative electrode device and a plurality of gas-gap devices. Gas-gap devices are separately set between branching channels and inlet and outlet manifolds of positive and negative electrodes. Each of the branching channels separately has an inserting tube to be inserted into one of the gas-gap devices. The diameter of the inserted vessel of gas-gap devices is bigger than the diameter of the inserting tube connected to a corresponding one of the branching channels. Thus, working liquids transferred to the positive and negative electrodes are segregated with coordination of the gas-gap devices. Only air spaces and discrete liquid drops are left between separated parts of the working liquids. Thus, shunted currents are repressed by preventing conductive paths from being formed between the positive and negative electrodes.

15 Claims, 7 Drawing Sheets

(51) Int. Cl.
*H01M 8/2483* (2016.01)
*H01M 8/24* (2016.01)
*H01M 8/04186* (2016.01)
*H01M 8/20* (2006.01)

(52) U.S. Cl.
CPC ........... *H01M 8/20* (2013.01); *H01M 8/2459* (2016.02); *H01M 8/2483* (2016.02); *Y02E 60/50* (2013.01)

FLOW BATTERY APPARATUS WITH SHUNTED CURRENT REPRESSED AND METHOD THEREOF

TECHNICAL FIELD OF THE INVENTION

The present invention relates to repressing shunted current; more particularly, relates to repressing shunted currents by preventing conductive paths of electrolytes from being formed between any pair of unit cells stacked in series to compose a corresponding battery, where flows of the electrolytes are segregated with gas gaps at positions between diverging manifolds and their corresponding branch channels before inletting unit cells, as well as at positions between flow-stream channels after outletting the unit cells and their corresponding converging manifolds while the gas gaps restrain shunt currents along the electrolytes between any pair of the unit cells with the shunt current repressed.

DESCRIPTION OF THE RELATED ARTS

Redox flow batteries have been studied for decades. Shunt current energy loss mostly occurred at flow batteries structured with unit cells stacked in series.

A general serial structure of flow battery comprises a series of unit cells. Each unit cell at least comprises positive and negative electrodes (usually plates), working liquids (usually electrolytes) and an ion exchange membrane. Working liquids flow onto each surface of electrode plates of the unit cells through branching channels with the help of diverging manifolds connected, and then leave the electrodes through the branching channels with the help of converging manifolds connected. It is quite often to form shunted currents owing to the working liquids conducted and the potential differences between the flow battery units. Hence, shunt current energy loss may occur and the efficiency of the flow battery becomes low.

To deal with the problem, one method is to apply protection circuits to the flow battery for repressing shunted currents. However, circuit complexity is thus increased and more energy is consumed by the additional circuits. The efficiency for repressing shunted currents is not good enough. Another method is to change the paths of the working liquids to reduce power loss. But, this will increase the structural complexity of the flow battery with limited efficiency. Another method is to integrate the above two methods. Nevertheless, the structure becomes more complex with power loss remained high and improvement unattainable.

Hence, the prior arts do not fulfill all users' requests on actual use.

SUMMARY OF THE INVENTION

The main purpose of the present invention is to repress shunted currents by preventing conductive paths of working electrolytes from being formed between any pair of unit cells, where the liquid flow streams between any pair of unit cells are segregated with gas gaps, so that very few of electric or ionic conduct of working liquid might cross the segregated gas gaps; working liquids is allowed to cross the gas-gap by discrete transferring with the shapes of droplets or bulky-drops, which do not reach both side of upper flow stream and lower flow stream simultaneously, to proceed the liquid flow without electric or ionic conduct to ensure the supply of working liquids reach each of unit cells of working; the segregating gas gaps are located at the positions between diverging manifolds and subsidiary flow streams before the inlets of each of unit cells as well as at the positions between the flow streams after the outlets of each of unit cells and converging manifolds to ensure the liquid flow streams between any pair of unit cells were segregated;

Another purpose of the present invention is to flow the working liquids of upper streams, i.e. before gas-gap devices, as falling drops discretely through the segregating gas gap onto the surface of bottom flow without connecting both of the upper and the bottom flows at any moment, where the conductive paths of working liquids that causes the shunt currents are cut off; meanwhile, the gas gaps do not intervene the working liquids flow through any of unit cells in batteries; the structure of the gas-gap device is that at least one channel holder (a tube, for example) inserts into the inside space of another channel holder in larger dimension through the top wall (or upper part of the inserted channel holder) to compose a total flow channel without leak; the working liquids flow in a shape of droplet (or bulky-drop) out of the narrower channel holder through the gas space of the inside of the wider channel holder onto the surface of bottom flows; the flowing drops never connect physically with the liquid of upper flow in the narrow channel holder and with the liquid of bottom flow in the wider channel holder in a meantime simultaneously; thus, current conductive is not able to access between the upper and the lower liquid flows since each of the channel holders is made of an insulate material; in order to increase the effect of preventing splashed dripping liquid from forming conductive connection, some fins attached on the wall can be applied; and, to improve the effect of making the flow droplets (or bulky-drops), a pulsatile or reciprocating flow pumping manner can be used; and, for compact reason, the gas-gap device can be also applied to the manifolds with common inserted vessel.

To achieve the above purposes, the present invention is a flow battery apparatus with shunted current repressed, comprising a positive electrode device, a negative electrode device and a plurality of gas-gap devices, where the positive electrode device comprises a plurality of positive electrodes, a plurality of first branching channels, an inlet diverging manifold and an outlet converging manifold; the first branching channels are separately connected with the positive electrodes at two sides; the inlet diverging manifold is connected to the first branching channels to be connected with the positive electrodes at one side of the positive electrodes; the outlet converging manifold is connected to the first branching channels to be connected with the positive electrodes at the other side of the positive electrodes; the negative electrode device comprises a plurality of negative electrodes, a plurality of second branching channels, an inlet diverging manifold and an outlet converging manifold; the second branching channels are separately connected with the negative electrodes at two sides; the inlet diverging manifold is connected to the second branching channels to be connected with the negative electrodes at one side of the negative electrodes; the outlet converging manifold is connected to the second branching channels to be connected with the negative electrodes at the other side of the negative electrodes; the gas-gap devices is located between the first and the second branching channels, the inlet diverging manifolds and the outlet converging manifolds; each of the first and second branching channels is connected with an inserting tube to be separately inserted into an inserted vessel of the gas-gap devices with a diameter of the inserting tube connected with the first and second branching channels smaller than a diameter of the inserted vessel of the gas-gap devices.

Accordingly, a method for novel flow battery apparatus with shunted current repressed is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
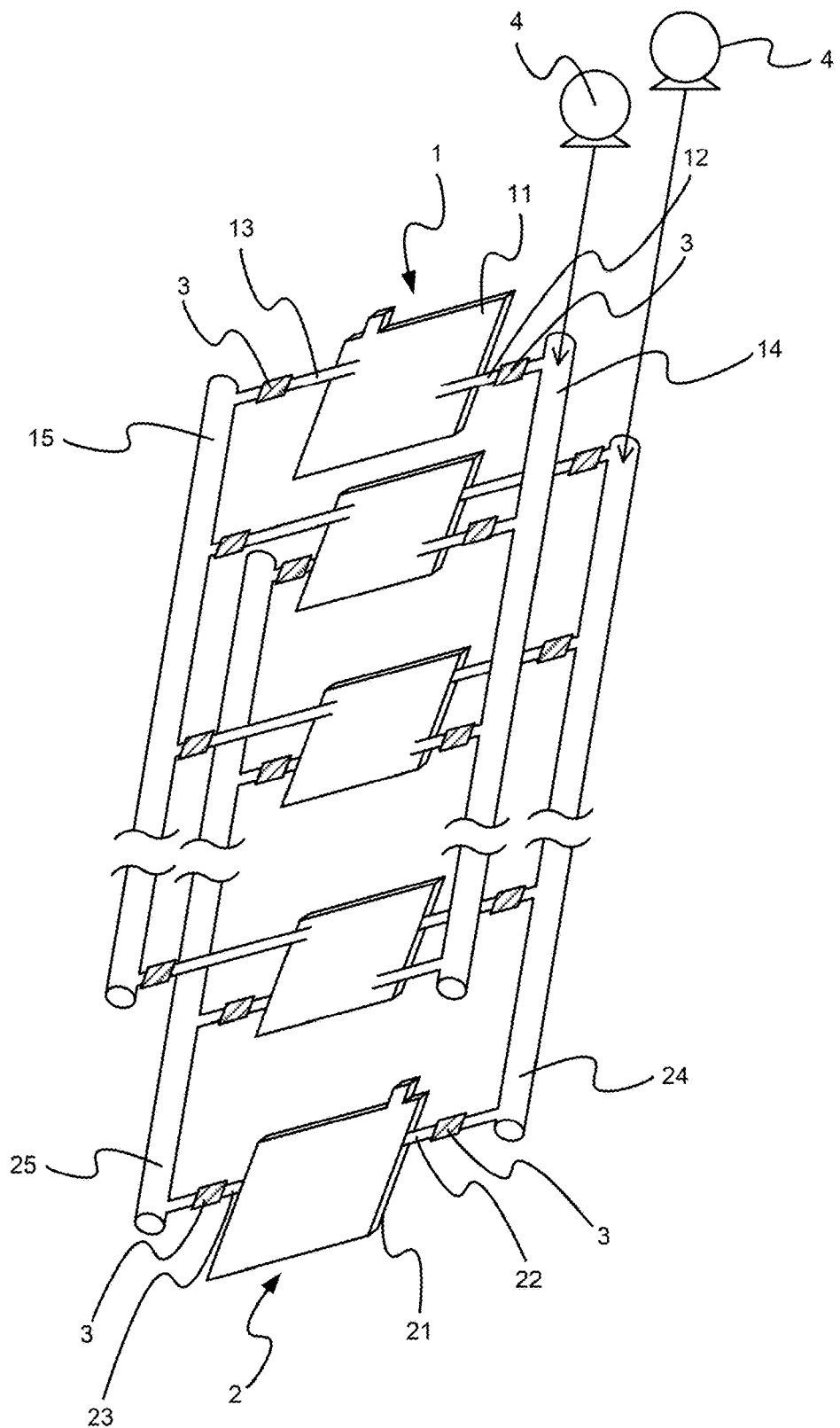
FIG. 1 is the perspective view showing the preferred embodiment according to the present invention.
Figure 2:
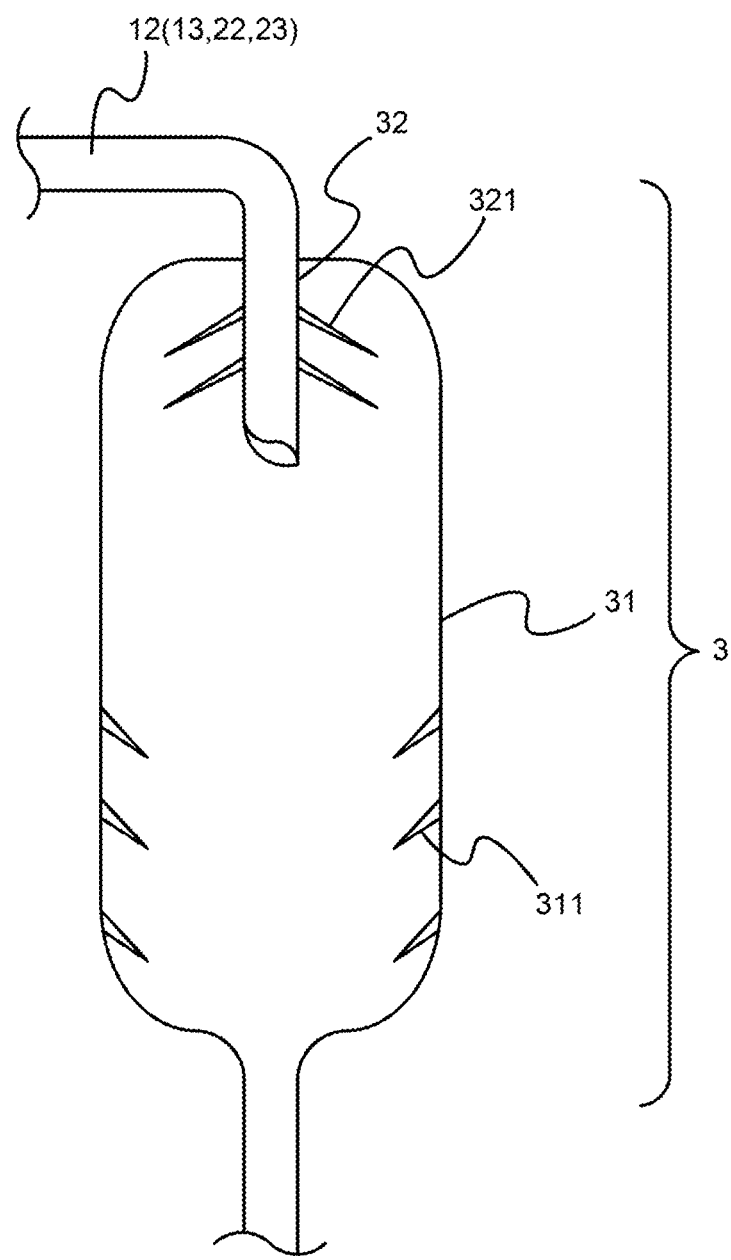
FIG. 2 is the view showing the first state-of-use of the gas-gap device.
Figure 3:
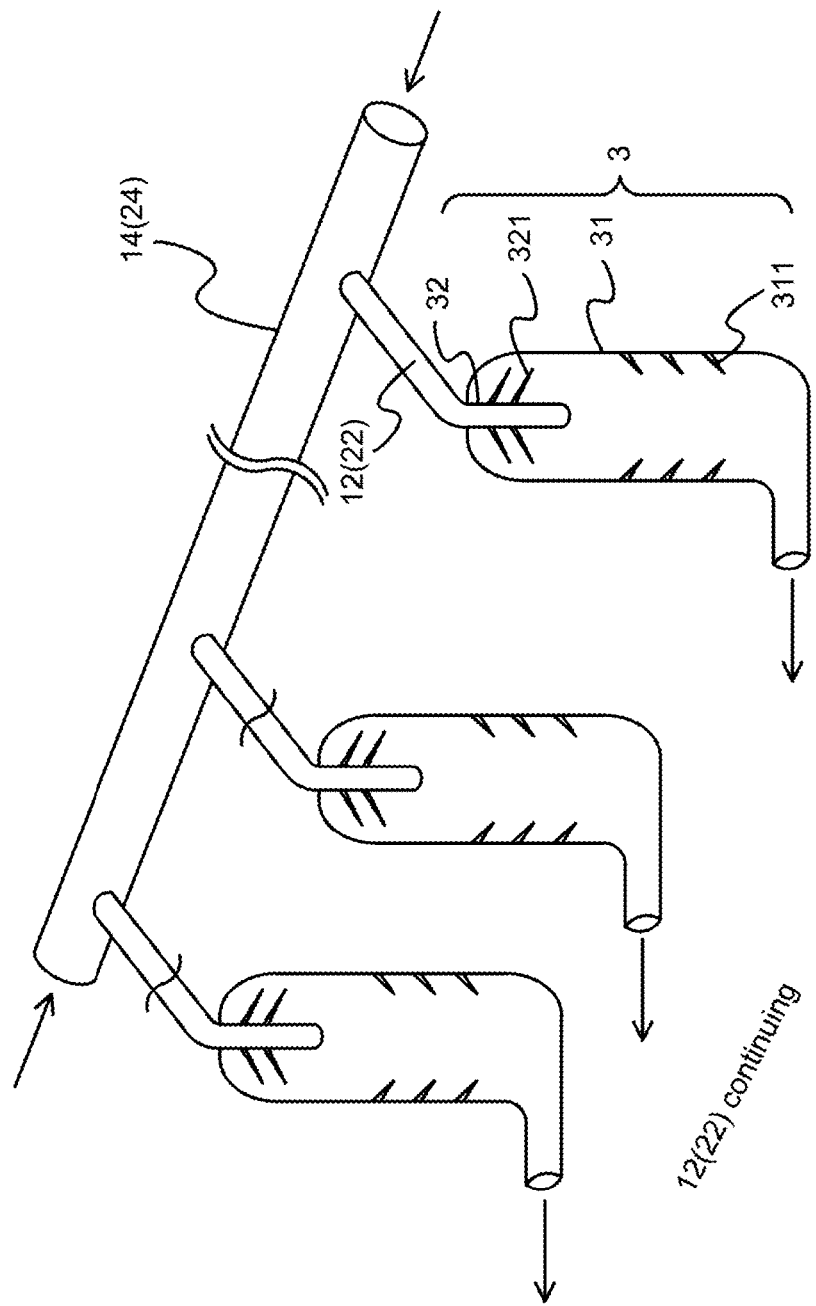
FIG. 3 is the view showing the connection of the first state-of-use of the gas-gap device to the inlet diverging manifold.
Figure 4:
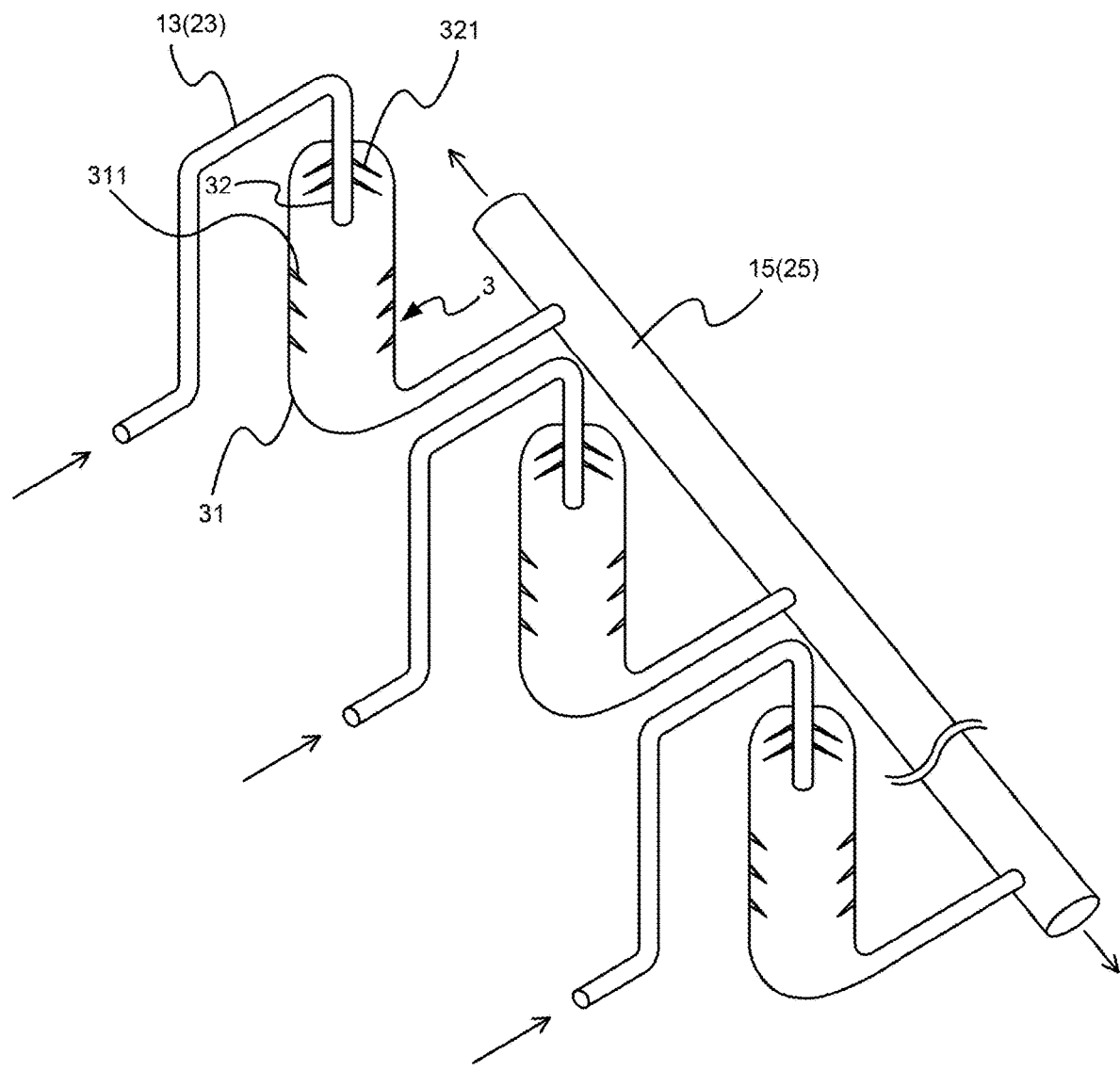
FIG. 4 is the view showing the connection of the first state-of-use of the gas-gap device to the outlet converging manifold.

The following description of the preferred embodiment is provided to understand the features and the structures of the present invention.

Please refer to FIG. 1~FIG. 4, which are a perspective view showing a preferred embodiment according to the present invention; a view showing the first state-of-use of the gas-gap device; and views showing connections of a first state-of-use of the gas-gap device to an inlet diverging manifold and an outlet converging manifold. As shown in the figures, the present invention is a flow battery apparatus with shunted current repressed. As is known, a traditional flow battery comprises a plurality of unit cells. Therein, a first unit cell of the flow battery has a terminal plate with a positive electrode and a negative electrode from one side of an adjacent bipolar plate; the bipolar plate has two electrodes having different polarity in each side and the electrodes belong to adjacent two unit cells; a last unit cell of the flow battery has a terminal plate with a negative electrode and a positive electrode from one side of adjacent bipolar plate; all the other unit cells of the flow battery has a positive electrode from one side of bipolar plate and a negative electrode from the other side of adjacent bipolar plate; and membranes are located between the plates with flowing electrolytes. The present invention comprises a positive electrode device 1, a negative electrode device 2 and a plurality of gas-gap devices 3. For simplicity, all positive electrodes are indicated as the positive electrode device 1, all negative electrodes are indicated as the negative electrode device 2 and membranes are not shown.

The positive electrode device 1 comprises a plurality of positive electrodes 11; a plurality of first branching channels 12,13 separately connected with the positive electrodes 11 at two sides; an inlet diverging manifold 14 connected with the first branching channels 12 to be connected with the positive electrodes 11 at one side; and an outlet converging manifolds 15 connected with the first branching channels 13 to be connected with the positive electrodes 11 at the other side. Therein, each of the first branching channels 12,13 has an inserting tube 32 made of an insulating material. Or, each of the gas-gap devices 3 has an inserted vessel 31 made of an insulating material. Or, a component made of an insulating material is set at each place where the inserting tube is inserted into the inserted vessel 31 of the gas-gap devices 3. Thus, the conductive of shunt current is prevented by gas-gap, within which are falling drops of working liquids between outlet of upper flow in the inserting tube 32 and surface of bottom flow in the inserted vessels 31 of the gas-gap devices 3. The droplets do not conduct because both flows at upper and bottom sides do not reach each other simultaneously.

The negative electrode device 2 comprises a plurality of negative electrodes 21; a plurality of second branching channels 22,23 separately connected with the negative electrodes 21 at two sides; an inlet diverging manifold 24 connected with the second branching channels 22 to be connected with the negative electrodes at one side; and an outlet converging manifold 25 connected with the second branching channels 23 to be connected with the negative electrodes 21 at the other side. Therein, each of the second branching channels 22,23 has an inserting tube 32 made of an insulating material. Or, the gas-gap devices 3 has an inserted vessel 31 made of an insulating material. Or, a component made of an insulating material is set at each place where the inserting tube 32 is connected with the inserted vessel 31 of the gas-gap devices 3. Thus, the conduction of shunt current is prevented by gas-gap, within which are falling drops of working liquids between outlet of upper flow in the inserting tube 32 and surface of bottom flow in the inserted vessel 31 of the gas-gap devices 3. The droplets do not conduct because both flows at upper and bottom sides do not reach each other simultaneously. The above describes the method of repressing shunt current.

The gas-gap devices 3 are made of at least a part of insulating materials and are separately set between the first and second branching channels 12,13,22,23; and the inlet diverging manifolds 14,24 and outlet converging manifolds 15,25 of the positive and negative electrodes 11,21. Each of the first and second branching channels 12,13,22,23 has an inserting tube 32 to be inserted into the inserted vessels 31 of the gas-gap devices 3 from upper side and do not touch bottom of the inserted vessels 31 of the gas-gap devices 3, where diameters of the inserting tubes 32 connected to the first and second branching channels 12,13,22,23 are smaller than diameters of the inserted vessels 31 of the gas-gap devices 3, to ensure that droplets out of the inserting tubes 32 do not touch side walls of the inserted vessels 31. Nevertheless, for increasing effect of preventing splashed dripping liquid from forming conductive connection, each of the inserting tubes 32 extended from the first and second branching channels 12,13,22,23 has a plurality of fins 321. The fins 321 are made of an insulating material and set at outer edge of each place where the inserting tube 32 of each of the first and second branching channels 12,13,22,23 is inserted into one of the inserted vessels 31 of the gas-gap devices 3; and, each one of the inserted vessels 31 of the gas-gap devices 3 has a plurality of fins 311 made of an insulating material set on an inner surface of the one of the inserted vessels 31 of the gas-gap devices 3. On using the present invention with the gas-gap devices 3, the number and the shapes of the inserting tubes 32 and the inserted vessels 31 of the gas-gap devices 3 are provided according to requirements, not restrained by shapes of round pipes, oval pipes, square pipes, polygonal pipes or shrinking (expending) pipes in different diameters. No matter how the number and shapes are changed, the key of the gas-gap devices is that the droplets out of the inserting channel holders (tubes) should not reach both the upper flow and the bottom flow simultaneously.

Figure 5:
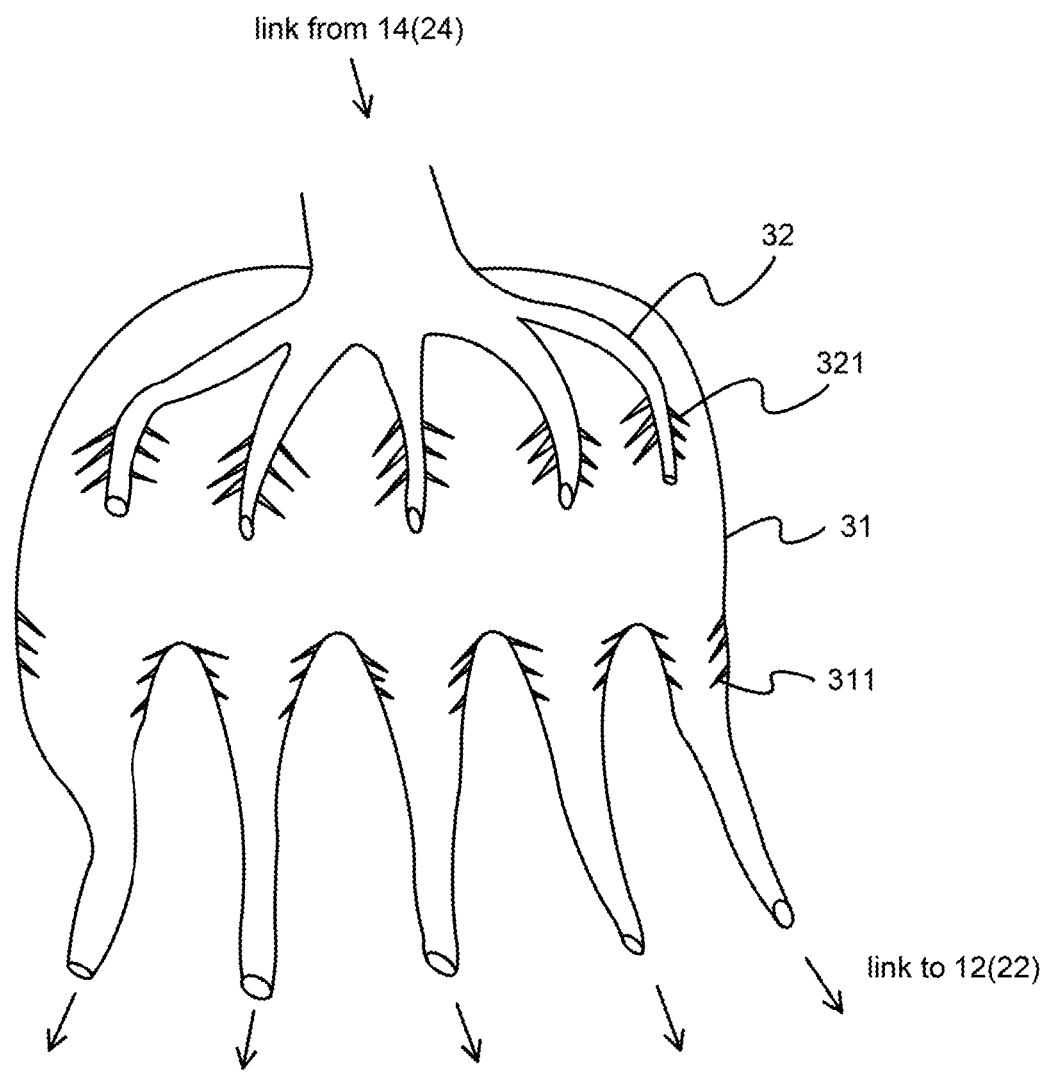
FIG. 5 is the view showing the second state-of-use of the gas-gap device.
Figure 6:
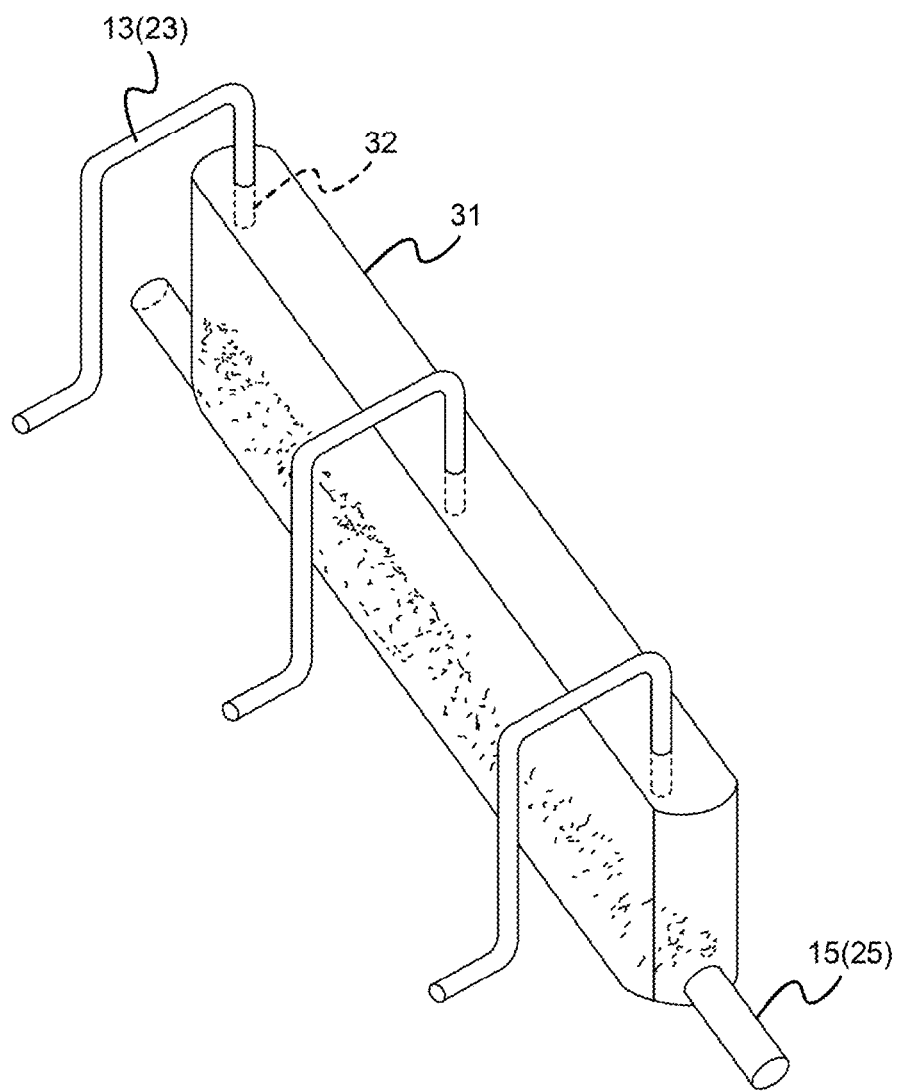
FIG. 6 is the view showing the third state-of-use of the gas-gap device.
Figure 7:
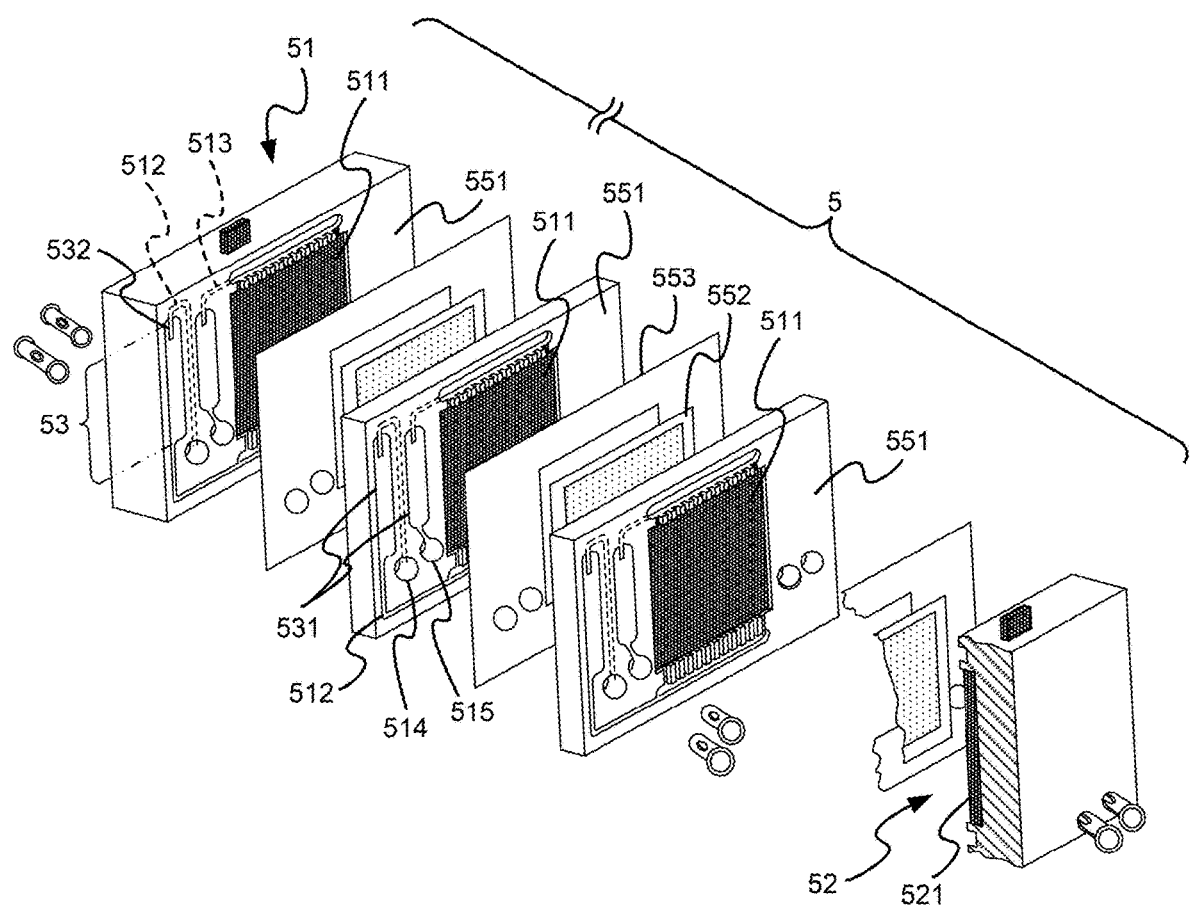
FIG. 7 is the explosive view showing the flow battery having the electrode-imbedded-plastic-frames with gas-gap devices.

Please further refer to FIG. 5~FIG. 7, which are a view showing a second state-of-use of the gas-gap device; a view showing a third state-of-use of the gas-gap device; and an explosive view showing a flow battery having electrode-imbedded-plastic-frames with gas-gap devices. As shown in FIG. 5, a state-of-use of a gas-gap device has a common inserted vessel 31 for a plurality of inserting tubes 32. And the common vessel 31 has several drain rooms, each of the drain rooms receives the falling drops from the respective inserting tube 32 positioned above. The result is the same as what is provided by FIG. 3. A benefit for this gas-gap device with a common inserted vessel is that it can be used as a compact diverging manifold with gas-gap built-in, and then makes the flow batteries compact.

As shown in FIG. 6, similarly, another state-of-use of gas-gap devices has a common inserted vessel 31 for a plurality of inserting tubes 32. The common vessel has only one drain room which receives the falling drops from all inserting tubes 32 above. The result is the same as what is provided by FIG. 4. A benefit is that it can be used as a compact converging manifold with gas-gap built-in, and also makes the flow batteries compact.

As shown in FIG. 7, for convenience of assembling a practical flow battery, plastic frames with imbedded electrodes are often used. An electrode-imbedded-plastic-frame type flow battery is stacked with several unit cells with common inlet ports and outlet ports. The flow battery 5 comprises a positive electrode device 51, a negative electrode device 52 and a plurality of gas-gap devices 53. The positive electrode device 51 is similar to the positive electrode device 1 shown in FIG. 1, but specified in the flow battery 5 shown in FIG. 7. Please note that, later in this document, the first digital (i.e. 5) of the series number of notation will stand for a similarity of the rest number used in FIG. 1 if exists, but used specifically in the flow battery 5 only. The positive electrode device 51 comprises a plurality of positive electrodes 511, a plurality of first branching channels 512,513, an inlet diverging manifold 514 and an outlet converging manifolds 515. The positive electrodes 511 are similar to the positive electrodes 11 shown in FIG. 1. The negative electrode device 52 is similar to the negative electrode device 2 shown in FIG. 1. The negative electrode device 52 has a plurality of negative electrodes 521. Each of the electrodes 511,521 is imbedded in a plastic frame 551. Among the adjacent electrode-imbedded plastic-frames 551 are the corresponding carbon felts with membranes 552, and packings 553 (not shown in FIG. 1 for simplicity). The first branching channels 512,513 are separately connected with the positive electrodes 511 at two sides. The connection zones between the positive electrodes 511 and the first branching channels 512,512 are designed for better distribution of working liquids, which is not further described for not on the purpose of the invention for repressing shunted current. The inlet diverging manifold 514 is connected with the first branching channel 512. The outlet converging manifold 515 is connected with the first branching channel 513. The gas-gap devices 53 are set between the diverging manifold 514 and the first branching channels 512, and between the converging manifold 515 and the first branching channels 513. Inserting tubes 532 are connected to the first branching channels 512,513 to be inserted into the inserted vessels 531 from an upper side and do not touch bottom of the inserted vessels 531 for leaving a distance at least that droplets do not connect both side of the inserted vessels 531 and the inserting tubes 532 simultaneously. It results in that very few of electric or ionic conduction of working liquid might cross gas gaps, and then shunted current is repressed. The above are descriptions about the first branching channels, the gas-gap devices and manifolds of positive. Similar designations applied for those of the negative electrodes. Although the drawings were covered in FIG. 7, the same results is available. Thus, the repression of shunted current is accomplished. Accordingly, a novel flow battery of electrode-imbedded-plastic-frames type with shunted current repressed is obtained.

To sum up, the present invention is a flow battery apparatus with shunted current repressed, where working liquids transferred to positive and negative electrodes are segregated with coordination of gas-gap devices and only few falling drops of working liquids go through gas spaces at a moment are left between segregated parts of the working liquids for repressing shunted currents by preventing conductive paths from being formed between the positive and negative electrodes of any pair of unit cells.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A flow battery apparatus with shunted current repressed comprising:
    a positive electrode device comprising a plurality of positive electrodes;
    a plurality of first branching channels separately connected with said plurality of positive electrodes at two sides;
    a first inlet diverging manifold connected to said plurality of first branching channels to be connected with said plurality of positive electrodes at the one side of said plurality of positive electrodes; and
    a first outlet converging manifold connected to said plurality of first branching channels to be connected with said plurality of positive electrodes at the other side of said plurality of positive electrodes;
    a negative electrode device comprising a plurality of negative electrodes;
    a plurality of second branching channels separately connected with said plurality of negative electrodes at two sides;
    a second inlet diverging manifold connected to said plurality of second branching channels to be connected with said plurality of negative electrodes at the one side of said plurality of negative electrodes; and
    a second outlet converging manifold connected to said plurality of second branching channels to be connected with said plurality of negative electrodes at the other side of said plurality of negative electrodes; and
    a plurality of gas-gap devices located between said pluralities of first and of said second branching channels, said first and second inlet diverging manifolds and said first and second outlet converging manifolds, wherein each of said plurality of first and of second branching channels is connected with an inserting tube to be separately inserted into an inserted vessel of said plurality of gas-gap devices with a diameter of said inserting tube connected with said pluralities of first and of second branching channels smaller than a diameter of said inserted vessel of said plurality of gas-gap devices.

2. The flow battery apparatus according to claim 1, wherein said inserting tube connected with said pluralities of first and of second branching channels has a coating made of an insulating material.

3. The flow battery apparatus according to claim 1, wherein said inserting tube connected with said pluralities of first and of second branching channels is made of an insulating material.

4. The flow battery apparatus according to claim 1, wherein an insulating material is located at each joint between said pluralities of first and of second branching channels, said inserting tube and said inserted vessel.

5. The flow battery apparatus according to claim 1, wherein said inserted vessel of said plurality of gas-gap devices contains an insulating material.

6. The flow battery apparatus according to claim 1, wherein said plurality of gas-gap devices are made of at least a part of insulating materials.

7. The flow battery apparatus according to claim 1, wherein each one of said pluralities of first and of second branching channels, each said first and second inlet diverging manifold, each said first and second outlet converging manifold, said inserting tube and said inserted vessel is selected from a group consist of a round pipe, an oval pipe, a square pipe, a polygonal pipe, a shrinking pipe, an expanding pipe and a deform pipe.

8. The flow battery apparatus according to claim 1, wherein each said first and second inlet diverging manifold has a driving unit to deliver liquid in a manner selected from a group consist of a pulsatile manner and a reciprocating manner.

9. The flow battery apparatus according to claim 1, wherein said inserted vessel is a common vessel to be inserted with said inserting tubes.

10. The flow battery apparatus according to claim 9, wherein said common vessel is connected to said pluralities of first and of second branching channels with each said first and second inlet diverging manifold and each said first and second inlet diverging manifold and has a plurality of individual rooms.

11. The flow battery apparatus according to claim 9, wherein said common vessel is connected to said pluralities of first and of second branching channels with each said first and second outlet converging manifold and each said first and second outlet converging manifold and has at least one room in common.

12. The flow battery apparatus according to claim 1, wherein each of said pluralities of positive and of said negative electrodes is imbedded in a plastic frame.

13. The flow battery apparatus according to claim 12, wherein said plastic frame has a plurality of flow channels.

14. The flow battery apparatus according to claim 13, wherein each of said plurality of flow channels has a gas-gap device.

15. The flow battery apparatus according to claim 1, wherein working liquids are segregated with coordination of said plurality of gas-gap devices on being delivered to said pluralities of positive and of negative electrodes and only gas spaces and discrete liquid drops are left between separated parts of said working liquids to repress shunted currents by preventing conductive paths from being formed between said pluralities of positive electrodes and of said negative electrodes.

* * * * *